(12) United States Patent
Ishida

(10) Patent No.: US 7,291,948 B2
(45) Date of Patent: Nov. 6, 2007

(54) ALTERNATOR WITH A COOLING FAN ROTATED WITH A ROTOR

(75) Inventor: Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/475,028

(22) Filed: Jun. 27, 2006

(65) Prior Publication Data

US 2007/0001524 A1    Jan. 4, 2007

(30) Foreign Application Priority Data

Jun. 30, 2005    (JP)    ............................ 2005-190840

(51) Int. Cl.
*H02K 9/00*    (2006.01)

(52) U.S. Cl. ...................................... 310/62

(58) Field of Classification Search ................ 310/62, 310/63, 68 D, 261; 416/213 R, 224 R
See application file for complete search history.

(56) References Cited

U.S. PATENT DOCUMENTS 5,021,696 A * 6/1991 Nelson .......................... 310/62
6,373,166 B1 * 4/2002 Asao et al. ................... 310/263

FOREIGN PATENT DOCUMENTS

| JP | A 05-004764 | 1/1993 |
|---|---|---|
| JP | U 5-4764 | 1/1993 |
| JP | A 9-154256 | 6/1997 |
| JP | A 2001-153095 | 6/2001 |

OTHER PUBLICATIONS

Hiroshi Ishida, "Rotor for On-vehicle Alternator", Journal of Denso Technical Disclosure, No. 124-072, p. 72, Jul. 15, 1995.

* cited by examiner

*Primary Examiner*—Dang Le
*Assistant Examiner*—Nguyen Hanh
(74) *Attorney, Agent, or Firm*—Oliff & Berridge, PLC

(57) ABSTRACT

An alternator has a rotor having magnetic poles along a circumferential direction and a cooling fan fixed to an end surface of the rotor in an axial direction. The fan has wing portions disposed along the circumferential direction. One wing portion has a fan base extending on or over first and second magnetic poles, first and second fixing members, respectively, fixing first and second fixing portions of the base to the first and second poles, and a fan blade extending from the fan base toward the axial direction. The base or blade has a boundary portion at which a boundary line between the blade and base crosses over a side line of the second pole, and a first distance between the first fixing portion and the boundary portion is substantially equal to a second distance between the second fixing portion and the boundary portion.

3 Claims, 3 Drawing Sheets

ALTERNATOR WITH A COOLING FAN ROTATED WITH A ROTOR

CROSS-REFERENCE TO RELATED APPLICATION

This application is based upon and claims the benefit of priority of the prior Japanese Patent Application 2005-190840 filed on Jun. 30, 2005 so that the contents of which are incorporated herein by reference.

BACKGROUND OF THE INVENTION

1. Field of the Invention

The present invention generally relates to an alternator, mounted in a vehicle such as a motor car or a motor truck, wherein a cooling fan generating a cooling wind is fixed to a rotor so as to be rotated with the rotor.

2. Description of Related Art

A well-known alternator for a vehicle has a cylindrical stator and a rotor disposed within a housing. The rotor is placed within a center hole of the stator so as to face the stator. The alternator electro-magnetically converts a rotational force of the rotor into an alternating current, and the current flows through armature windings of the stator. Cooling fans are fixed to both ends of the rotor in an axial direction of the rotor, respectively. The fans are rotated with the rotor and generate a cooling wind. The wind flows on the surface of field windings of the rotor along the axial direction, cools a rectfier and armature windings of the stator, and is discharged from windows opened in the housing. The alternator sometimes has a fan base between a core of the rotor and each cooling fan, and the fan base adjusts the flow direction of the wind.

Recently, it has been required to reduce the noise in a vehicle compartment, so that an alternator has been required to suppress the generation of sound or noise of a specific frequency zone offensive to the ear. To reduce the noise, Published Japanese Patent First Publication No. H09-154256 discloses an alternator wherein a cooling fan has variable pitch blades arranged at different pitches along a circumferential direction of the rotor. The blades are fixed to seats (i.e., end surfaces in the axial direction) of nail-shaped magnetic poles of a rotor and extend toward the axial direction so as to stand on the rotor. This alternator suppress the generation of sounds of the specific frequency zone by shifting the frequency of generated sounds to frequencies other than the specific frequency zone.

However, in case of the use of the variable pitch blades in a cooling fan, because the nail-shaped magnetic poles are disposed at equal intervals along the circumferential direction, it is required to fix the blades disposed at different pitches to the poles disposed at equal intervals. Therefore, the blades cannot arbitrarily be fixed to the poles, so that it is difficult to weld the fan to the rotor at a sufficient strength. Because the blades standing on the rotor receives a centrifugal force during its high rotation operation so as to be pulled away from the rotor in the radial and axial directions, a welded portion of the fan sometimes comes off from the rotor, or a portion of the fan where stress is concentrated is sometimes cracked.

To avoid these problems, when each blade plate is thickened to be tightly welded to the rotor, the material cost of the fan is undesirably heightened. Further, when ribs additionally added to each blade are welded to the stress concentrated portion, the flow of the wind is disturbed by the ribs so as to increase fan noise. Because positions of the ribs on the seats are restricted, it is difficult to avoid the increase of the noise.

As another technique for tightly fixing a cooling fan to a rotor, welding positions of the fan are adjusted. For example, Published Japanese Utility Model First Publication No. H05-4764 discloses that a welding position of each blade is placed on a line connecting a center position of the blade receiving a centrifugal force during its rotation and a shaft center of a rotor core. Further, a technical publication No. 124-072 published by Denso corporation discloses a fan wherein a welding portion of each blade is placed outside a circular area which has a diameter equal to 68% of an outer diameter of the fan around a shaft axis of a rotor. However, in these techniques, fans having various blade shapes and arrangements cannot be fixed to rotors at sufficient strength, respectively.

SUMMARY OF THE INVENTION

An object of the present invention is to provide, with due consideration to the drawbacks of the conventional alternator, an alternator wherein a cooling fan is tightly fixed to a rotor so as to be rotated with the rotor.

According to a first aspect of this invention, the object is achieved by the provision of an alternator comprising a stator, a rotor, and a cooling fan fixed to an end surface of the rotor in an axial direction of the rotor. The rotor has a plurality of magnetic poles along a circumferential direction of the rotor and is rotatable on its own axis while electro-magnetically interacting with the stator. The fan has a plurality of wing portions disposed along the circumferential direction and being rotated with the rotor. One of the wing portions has a fan base extending on or over a first magnetic pole and a second magnetic pole adjacent to each other, a first fixing member fixing a first fixing portion of the fan base to the first pole, a second fixing member fixing a second fixing portion of the fan base to the first pole, and a fan blade extending from the fan base toward the axial direction. The fan base or fan blade has a boundary portion at which a boundary line between the fan blade and the fan base crosses over a side line of the second magnetic pole facing the first magnetic pole, and a first distance between the first fixing portion and the boundary portion is substantially equal to a second distance between the second fixing portion and the boundary portion.

Accordingly, because stress added to the fan base during the rotation of the rotor is equally distributed to the first and second fixing members, the fixing of the fan to the rotor can be reliably maintained.

According to a second aspect of this invention, the fan base or the fan blade has a contact portion in place of the boundary portion. The contact portion is in contact with the second magnetic pole during the rotation of the rotor, and a first distance between the first fixing portion and the contact portion is substantially equal to a second distance between the second fixing portion and the contact portion.

Accordingly, the fixing of the fan to the rotor can be reliably maintained.

DETAILED DESCRIPTION OF THE PREFERRED EMBODIMENTS

Embodiments of the present invention will now be described with reference to the accompanying drawings. However, these embodiments should not be construed as limiting the present invention to structures provided in the embodiments, and the structure of this invention may be combined with that based on the prior art.

Embodiment 1

Figure 1:
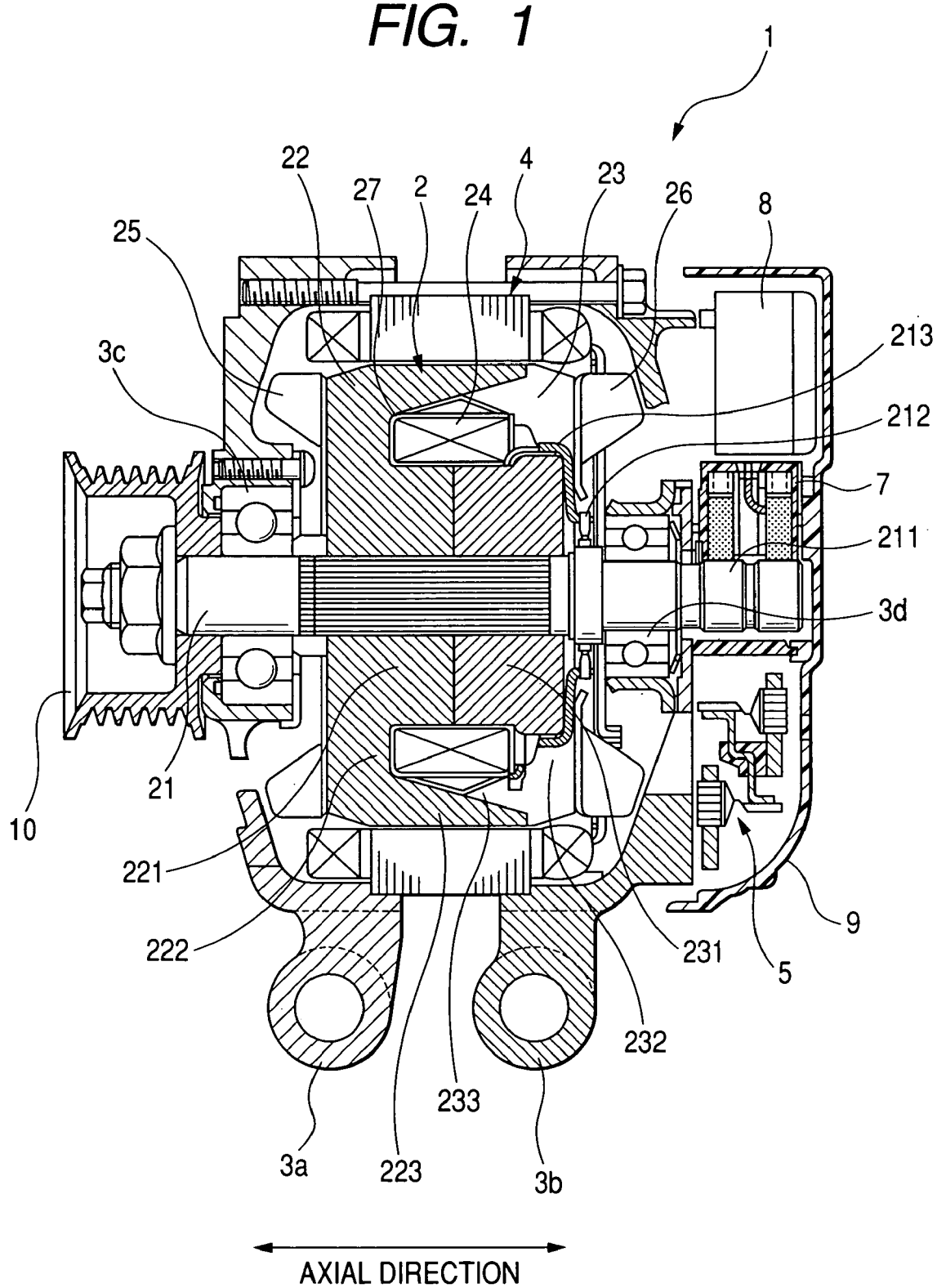
FIG. 1 is a vertical sectional view of an alternator according to embodiments of the present invention.

FIG. 1 is a vertical sectional view of an alternator according to embodiments of the present invention. As shown in FIG. 1, an alternator 1 has a Lundell type of rotor 2, and a cylindrical stator 4 acting as an armature. The rotor 2 is disposed in a center hole of the stator 4 and is rotatable on its own axis. The alternator 1 may further have a front frame 3a holding the rotor 2 through a bearing 3c, a rear frame 3b holding the rotor 2 through a bearing 3d, a rectifier 5 for converting an alternating current outputted from the stator 4 into a direct current, a brush element 7 holding brushes through which a field current is supplied to a field coil 24 of the rotor 2 for each phase, a voltage control unit 8 for controlling an output voltage of the direct current, and a protection cover 9 made of resin and attached to the rear frame 3b so as to cover electric members such as the rectifier 5, the brush element 7 and the unit 8.

The rotor 2 has a pulley 10 receiving a rotational force from an engine (not shown) through a belt (not shown), a rotary shaft 21 fixed to the pulley 10, a pair of pole cores 22 and 23 engaged with the shaft 21, an insulated bobbin 27 inserted into the cores, a field coil 24 wound on the bobbin 27 for each of phases, a cooling fan 25 fixed to an end surface of the core 22 on a front side in an axial direction of the rotor 2, and a cooling fan 26 fixed to an end surface of the core 23 on a rear side in the axial direction. The core 22 has a boss portion 221, a disc portion 222 extending from an end of the portion 221 along a radial direction of the rotor 2, and eight nail-shaped magnetic poles 223 extending from the portion 222 along the axial direction. The core 23 has a boss portion 231, a disc portion 232 extending from an end of the portion 231 along the radial direction, and eight nail-shaped magnetic poles 233 extending from the portion 232 along the axial direction. The poles 223 and 233 are alternately disposed along a circumferential direction of the rotor 2 so as to face the stator 4. The bobbin 27 is surrounded by the portions of the cores.

A plurality of slipping rings 211 and a plurality of lead terminals 212 electrically connected with the rings 211 are integrally molded with the shaft 21. A plurality of lead wires 213, respectively, connect the field coils 24 and the terminals 212. The shaft 21 is inserted into a center hole of the cores 22 and 23, and the field coils 24 are electrically connected with the rings 211 through the wires 213 and terminals 212.

A field current is supplied to each coil 24 through the element 7, the ring 211, the terminal 212 and the wire 213, so that the poles 223 and 233 act as electromagnets. When the rotor 2 is rotated on its axis, the stator 4 and the rotor 2 electro-magnetically interact with each other, and an alternating current is generated in coils wound on the stator 4. The generated current is converted into a direct current in the rectifier 5. A voltage of the direct current is adjusted in the unit 8, and the direct current is outputted from the alternator. During the generation of the alternating current, heat is generated in the coils of the stator 4 and the rectifier 5. To remove the heat from the alternator, blades of the fans 25 and 26 are rotated with the rotor 2.

Figure 2:
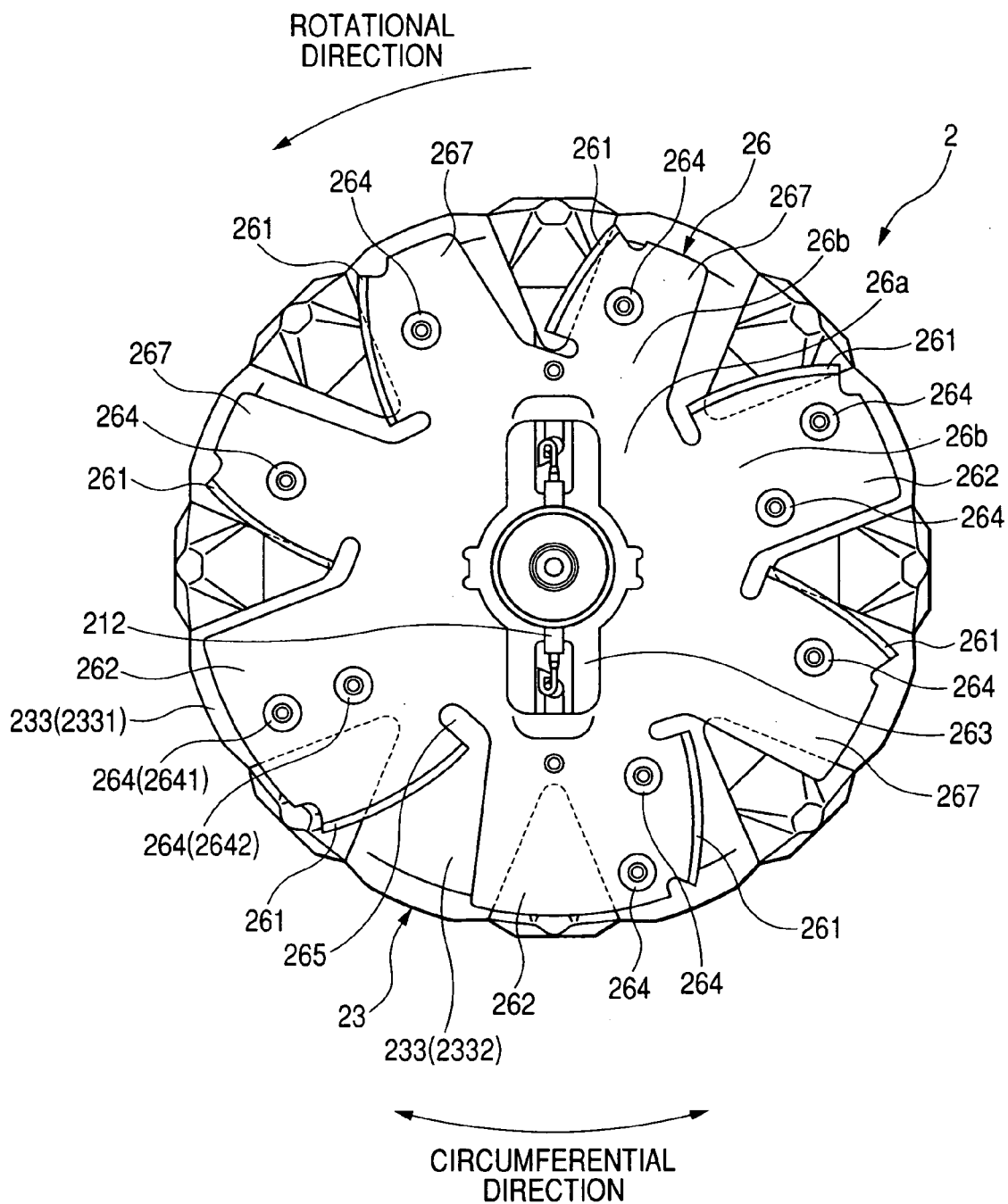
FIG. 2 is a plan view of a cooling fan seen from a rear side of the alternator.

FIG. 2 is a plan view of the fan 26 seen from the rear side of the alternator. As shown in FIG. 2, the fan 26 has a center portion 26a and seven wing portions 26b disposed along the circumferential direction. The center portion 26a has an opening 263 in which the shaft 21 and the lead terminals 212 are disposed. Each of four wing portion 26b has a fan blade 261 and a fan base 267 holding the blade 261. Each of the other three wing portions 26b has a fan blade 261 and a fan base 262 holding the blade 261. The seven blades 261 are disposed at different intervals along the circumferential direction. Each blade 261 is integrally formed with the base 262 or 267 and extends from one side of the base toward the axial direction so as to stand on the base. Each blade 261 is curved toward a direction opposite to a rotational direction of the rotor 2 while being away from the center axis of the rotor 2. Each of the bases 262 and 267 extends on or over one magnetic pole 233 of the rotor 2.

The fan 26 further has ten fixing members 264 to fix the bases 262 and 267 to the poles. More specifically, each of the four bases 267 is connected with the corresponding pole 233 by one fixing member 264, and each of the other three bases 262 is connected with the corresponding pole 233 by two fixing members 264. Each base is, for example, welded to the core 23.

Each blade 261 has a cut-off space 265 on an inner side of each blade 261 in the radial direction and is placed nearer to the axis of the rotor 2 than the fixing member(s). Each space 265 is formed in a slit shape and extends along the circumferential direction. When the blade 261 is formed by bending a portion of the wing portion 26b toward the axial direction, a stress is generated on the inner side of the blade 261. The space 265 of the blade 261 reduces this stress.

Figure 3:
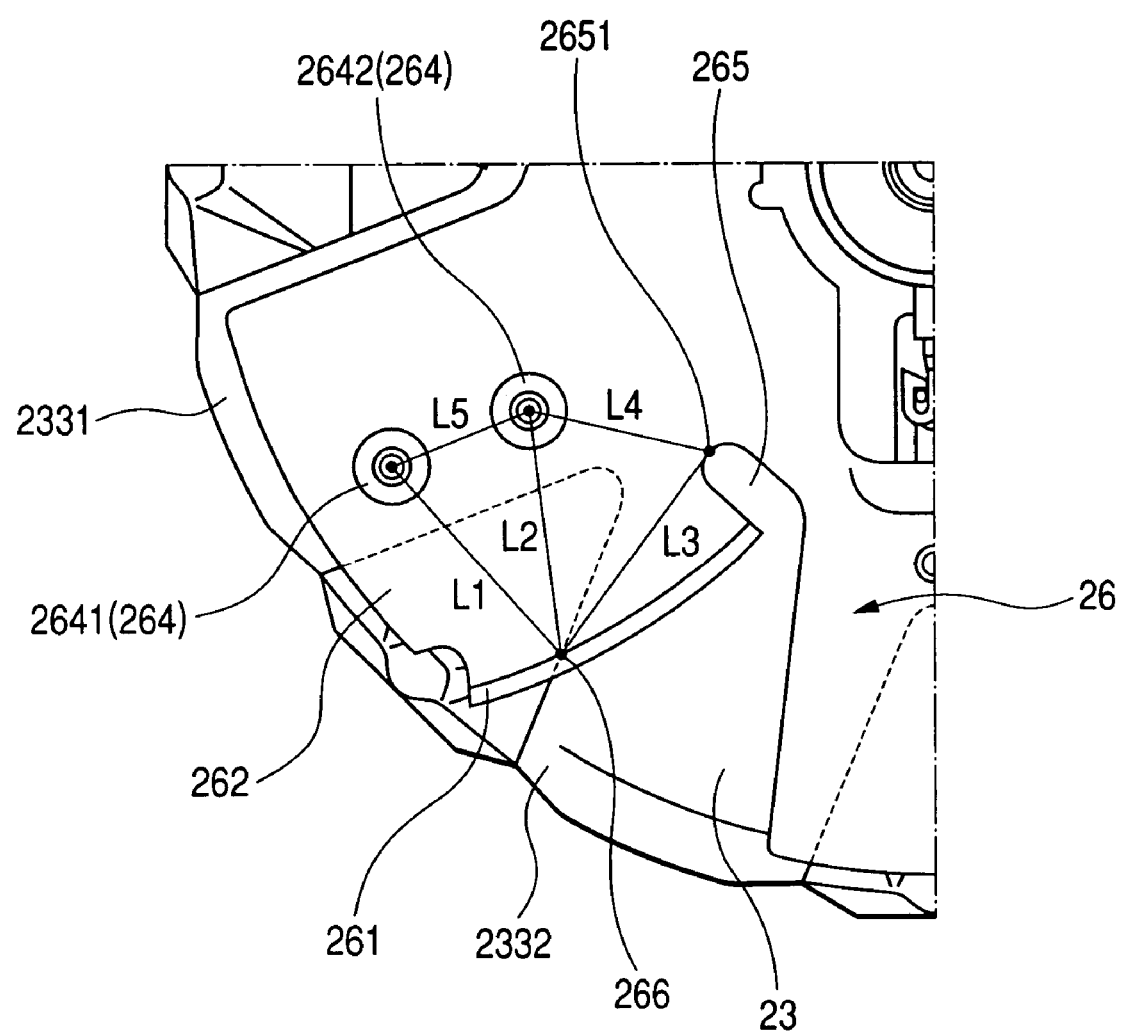
FIG. 3 is an enlarged view of one fan base of the fan shown in FIG. 2 and shows a positional relation among two fixing members and the fan base.

FIG. 3 is an enlarged view of one wing portion 26b having the fan base 262 connected with the corresponding magnetic pole by two fixing members 264. As shown in FIG. 3, one of the bases 262 extends on or over a first pole 2331 and is fixed to the first pole by both a first fixing member 2641 and a second fixing member 2642. The first member 2641 is placed further away from the center axis of the rotor 2 than the second member 2642. A portion of the base 262 and a portion of the blade 261 further extends on or over a second pole 2332 adjacent to the first pole 2331. The blade 261 or the base 262 has a boundary portion 266 at which a boundary line between the blade 261 and the base 262 crosses over a side line of the second pole 2332 facing the first pole 2331. A portion of the blade 261 extending from the boundary portion 266 to the cut-off space 265 is placed over the second pole 2332.

When the blade 261 and base 262 are rotated along the circumferential direction, either the boundary portion 266 or a portion of the blade 261 or base 262 near the portion 266 comes in contact with a seat (or end surface in the axial direction) of the second pole 2332, due to the centrifugal force acting on the blade 261 and base 262. At this time, the centrifugal force acts on the base 262 so as to pull the base 262 away from the rotor 2 in the axial direction. Therefore, a stress based on the centrifugal force is added to each of the fixing members.

In this embodiment, a first distance L1 between the first fixing member 2641 and the boundary portion 266 is set to be substantially equal to a second distance L2 between the second fixing member 2642 and the boundary portion 266. More specifically, the members 2641 and 2642, respectively, fix a first fixing portion and a second fixing portion of the base 262 to the magnetic pole, and each fixing portion has a definite area perpendicular to the axial direction. In this embodiment, it is required that a distance between an arbitrary position of the first fixing portion and the boundary portion 266 is set to be equal to a distance between an arbitrary position of the second fixing portion and the boundary portion 266. Therefore, a distance L1 between a center position of the first fixing portion and the boundary portion 266 is set to be substantially equal to a distance L2 between a center position of the second fixing portion and the boundary portion 266.

Because the distance L1 is set to be substantially equal to the distance L2, the stress added to the first member 2641 can be equalized with that added to the second member 2642. Accordingly, the fixing of one base 262 to the rotor 2 can be reliably maintained against the centrifugal force, so that the fixing of the fan 26 to the rotor 2 can be reliably maintained. Further, when each fixing member is formed in a shape appropriate to the projection welding, the shape and welding conditions can be specified. Therefore, productivity of alternators can be improved.

The cut-off space 265 extends along the circumferential direction and reaches an cut-off end portion 2651 of the base 262. In this embodiment, a third distance L3 between the cut-off end portion 2651 and the boundary portion 266 is preferably set to be substantially equal to the first distance L1. When the centrifugal force acts on the blade 261 and base 262, the end portion 2651 also receives stress. Because the first, second and third distances are set to be equalized with one another, the stress added to the base 262 can be equally distributed to portions where stress is concentrated. For example, stress is concentrated on the fixing members 2641 and 2642 and the end portion 2651. Accordingly, generation of cracks or breakages in the stress concentrated portions can be effectively prevented.

Further, a fourth distance L4 between the cut-off end portion 2651 and the second fixing member 2642 is preferably set to be substantially equal to a fifth distance L5 between the first and second fixing members 2641 and 2642. Accordingly, stress added to the base 262 can be equally distributed along the radial direction, and the fixing of the base 262 to the rotor 2 can be further reliably maintained against the centrifugal force.

In this embodiment, two fixing members 2641 and 2642 in only one base 262 satisfy a positional relation shown in FIG. 3. However, two fixing members 2641 and 2642 may satisfy the positional relation in each of the three bases 262.

Further, fixing members of the fan 25 may satisfy the positional relation shown in FIG. 3.

Moreover, the seven blades 261 may be disposed at equal intervals along the circumferential direction.

Furthermore, the alternator is mounted in a vehicle. However, the present invention is not limited to the alternator mounted in a vehicle, but may be an alternator installed in a building to generate electric power in an emergency case.

Still further, each base is welded to the core 23. However, each base may be fixed to the core 23 by a screw. In this case, a through hole is formed in a fixing portion of the base, and a screw is inserted into the hole.

Embodiment 2

In the first embodiment, the distances L1, L2 and L3 from the boundary portion 266 are set to be equal to one another.

In contrast, in the second embodiment, a first distance between the first member 2641 and a contact portion of the blade 261 or base 262 extending on or over the magnetic poles 2331 and 2332 is set to be equal to a second distance between the second member 2642 and the contact portion, and a third distance between the end portion 2651 and the contact portion is set to be equal to the first distance. The contact portion is in contact with the second pole 2332 of the rotor 2 during the rotation of the rotor 2, and is placed over the rotor 2 when the rotor 2 is not rotated. The contact portion is placed near the boundary portion 266.

Accordingly, in the same manner as in the first embodiment, the fixing of the fan 26 to the rotor 2 can be reliably maintained against the centrifugal force.

What is claimed is:

1. An alternator for a vehicle, comprising a cooling fan which is disposed on at least one of an axial-directional end surface of a Lundell type rotor having a plurality of nail-shaped magnetic poles, a plurality of fan bases fixedly attached to the axial-directional end surface of the rotor by fixing members, such as welding members and a plurality of fan blades, respectively, disposed to stand on the corresponding fan base along an axial direction of the cooling fan, and the cooling fan generating a cooling wind for cooling a heat generating portion while being integrally rotated with the rotor, wherein a portion of one fan blade extending from a boundary portion, at which a boundary line between the one fan blade and the correspond fan base crosses over a side line of one of the nail-shaped magnetic poles facing another one of the nail-shaped magnetic poles, is placed over the one nail-shaped magnetic pole, the corresponding fan base has an opposing surface which is opposite to the another one of the nail-shaped magnetic poles, and on the opposing surface of the corresponding fan base, among a plurality of fixing portions corresponding to the another one nail-shaped magnetic pole, a distance L1 between a first fixing portion placed on an outer-diameter side with respect to a rotational axis of the rotor and the boundary portion is set to be almost equal with a distance L2 between a second fixing portion placed on an inner-diameter side and the boundary portion.

2. The alternator for a vehicle according to claim 1, wherein:

a cut-off space is formed in a portion of the corresponding fan base at a position of the inner-diameter side of the one fan blade along a circumferential direction of the cooling fan, a distance L3 between an end portion of the cut-off space and the boundary portion is set to be almost equal with the distance L1 between the first fixing portion and the boundary portion.

3. The alternator for a vehicle according to claim 2, wherein:

a distance L4 between the end portion of the cut-off space and the second fixing portion is set to be almost equal with a distance L5 between the first fixing portion and the second fixing portion.

* * * * *